United States Patent [19]

Hawley

[11] Patent Number: 4,628,755
[45] Date of Patent: Dec. 16, 1986

[54] X-Y POSITION CONTROLLER HAVING AXIALLY-INCLINED TRANSDUCER MEMBERS

[76] Inventor: Jack S. Hawley, 1741 8th St., Berkeley, Calif. 94710

[21] Appl. No.: 715,396

[22] Filed: Mar. 25, 1985

[51] Int. Cl.⁴ ............................................. G05G 9/00
[52] U.S. Cl. ............................... 74/471 XY; 340/710; 33/1 M
[58] Field of Search ................... 74/471 XY, 198, 206; 340/710; 33/1 M, 122, 123, 124

[56] References Cited

U.S. PATENT DOCUMENTS

| | | | |
|---|---|---|---|
| 3,269,190 | 8/1966 | Laman | 74/471 |
| 3,541,541 | 11/1970 | Engelbart | 340/324 |
| 3,613,090 | 10/1971 | Mason | 33/1 M |
| 3,835,464 | 9/1974 | Rider | 340/324 A |
| 3,892,963 | 7/1975 | Hawley et al. | 250/231 R |
| 3,987,685 | 10/1976 | Opocensky | 74/471 |
| 4,210,032 | 7/1980 | Lampert | 74/198 |
| 4,390,873 | 6/1983 | Kirsch | 340/710 |
| 4,404,865 | 9/1983 | Kim | 340/710 |
| 4,503,614 | 3/1985 | Tuss | 33/1 M |

OTHER PUBLICATIONS

Design News, Feb. 18, 1985, p. 110, "Computer Mouses Uses Independent Suspension", David J. Bak.

*Primary Examiner*—Lawrence J. Staab
*Assistant Examiner*—Martin G. Belisario
*Attorney, Agent, or Firm*—Robert B. Chickering; Glen R. Grunewald

[57] ABSTRACT

A mouse (X-Y position controller) having axially-inclined transducer assemblies—preferably almost perpendicular to the surface on which the mouse is operated—for a compact, greatly simplified structure. The drive wheel of such an assembly can then be small relative to the transducer disk of that assembly, with considerably reduced precision requirements for location of indicia on the disk. Moreover, by use of a pair of spaced ring magnets urging the drive wheel toward the operational surface for the mouse, significant contact force against the operating surface is provided while eliminating substantially all of the friction attendant upon use of even a so-called antifriction thrust bearing. Due to the magnitude of the available contact force, the drive wheel can be of a hard and durable material rather than an elastomer and still provide improved tractional characteristics even on such a difficult operating surface as, for example, oiled teflon. Lastly, the arrangement precludes possible contamination of interacting moving components, partly because there are no interacting moving members but mostly because nothing that touches the potentially dirty operating surface ever enters the mouse assembly.

14 Claims, 10 Drawing Figures

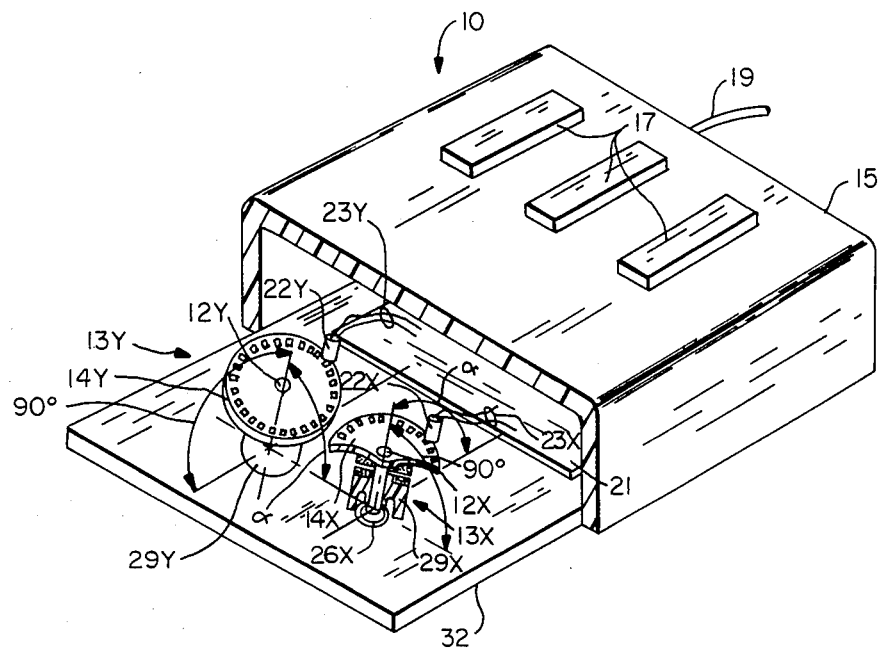
FIG. —1
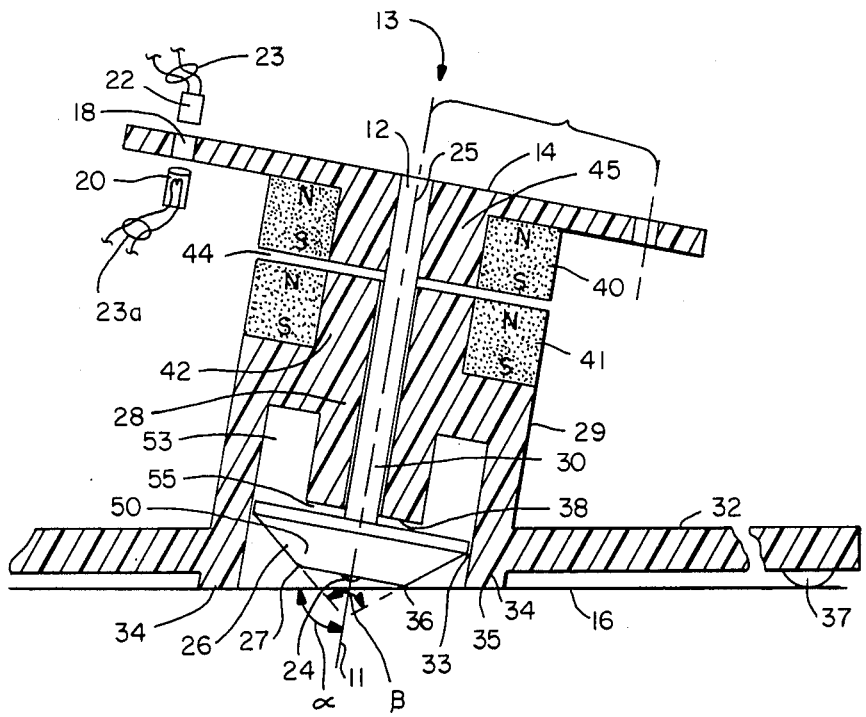
FIG. —2

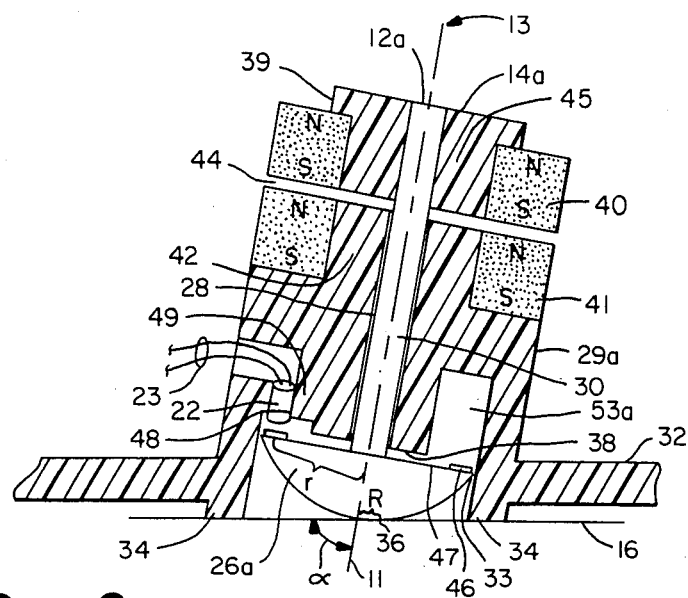
FIG.—2a
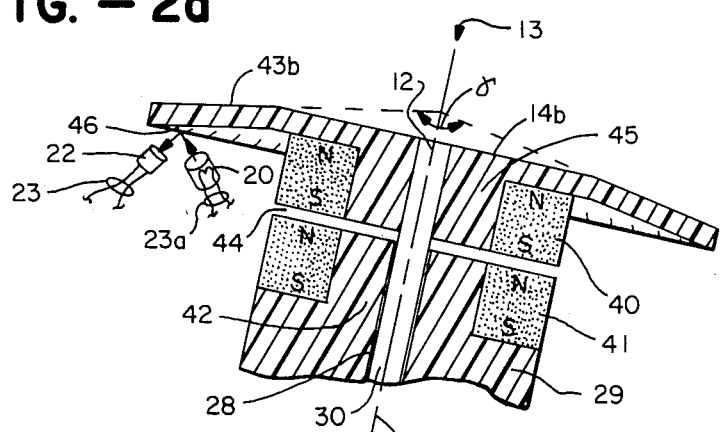
FIG.—2b
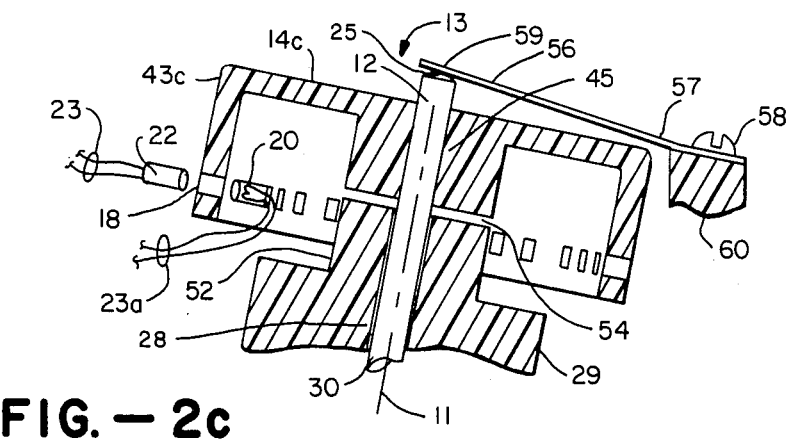
FIG.—2c

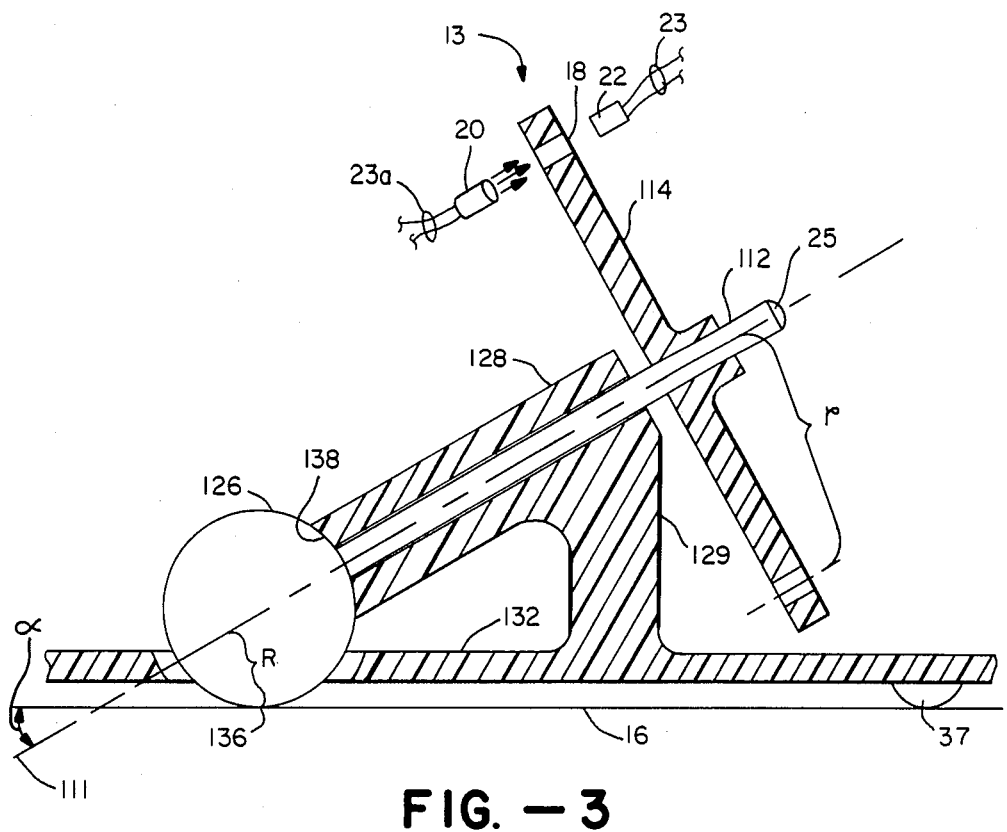
FIG.—3
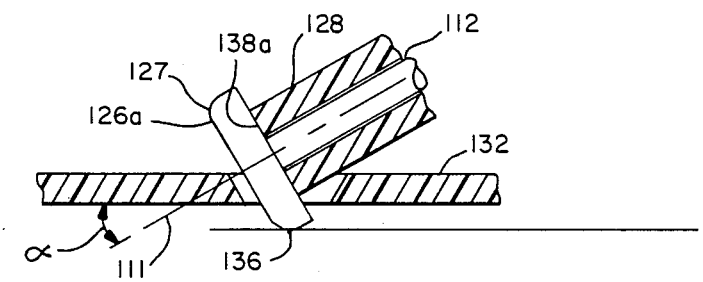
FIG.—3a
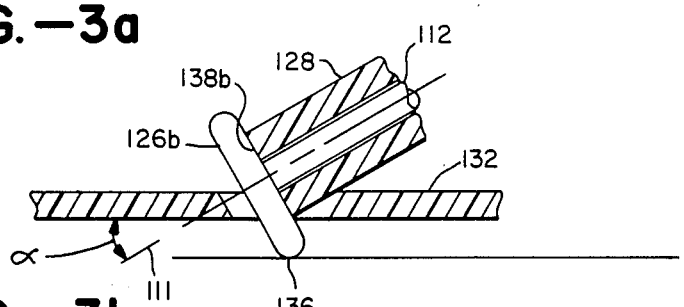
FIG.—3b

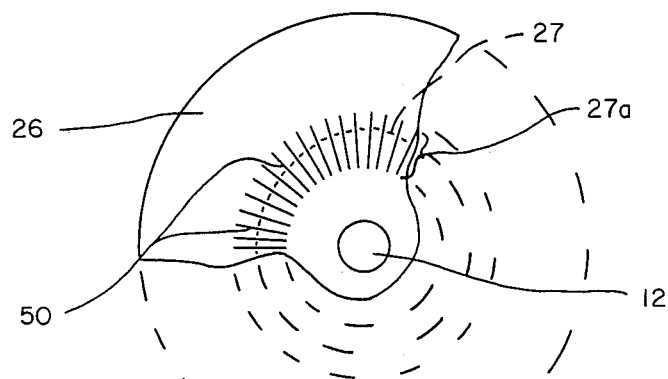
FIG.—4
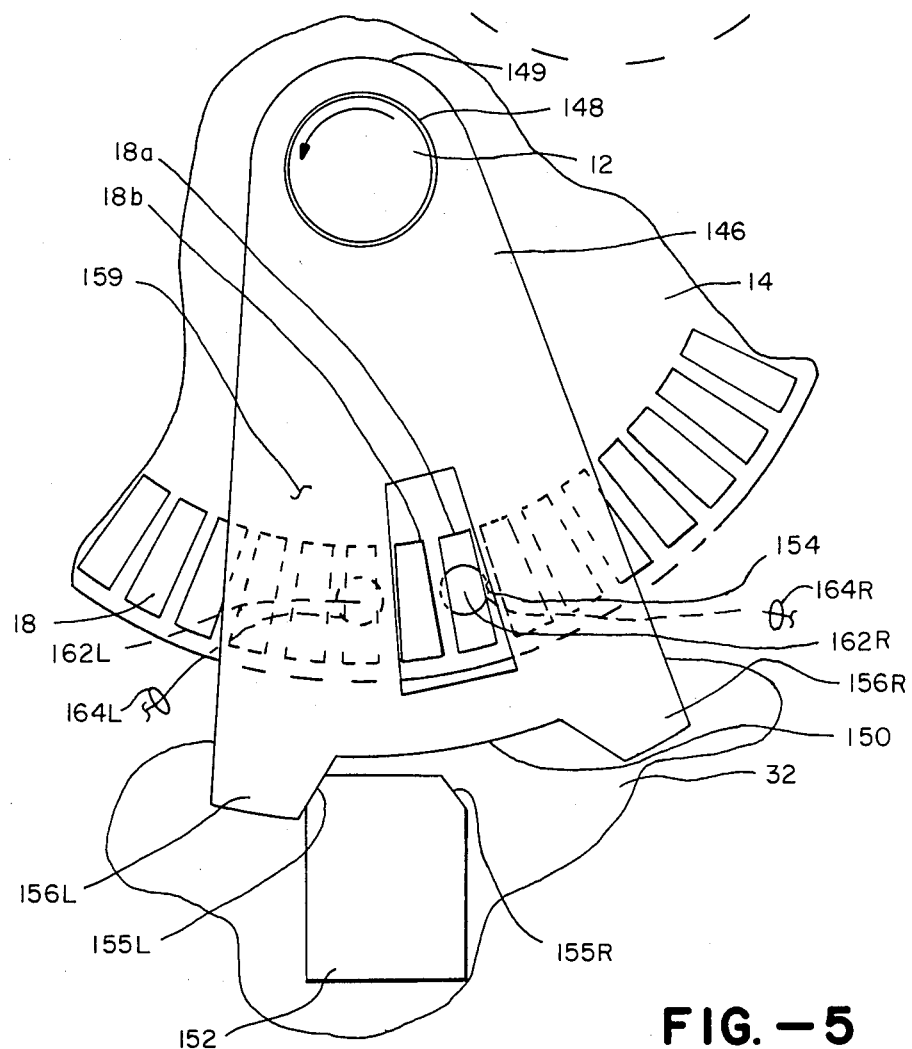
FIG.—5

X-Y POSITION CONTROLLER HAVING AXIALLY-INCLINED TRANSDUCER MEMBERS

BACKGROUND OF THE INVENTION

1. Field of the Invention

The invention relates to a position control device of the type riding over a surface for remotely controlling, say, movement of a cursor over a visual display, or for X-Y measuring purposes—i.e., it relates to a "mouse", as commonly termed in computer art.

2. Prior Art

Devices of this type are well-known (see, for example, my pending application Ser. No. 572,233 filed Jan. 19, 1984 and entitled "Remote Cursor Positioning Apparatus", and U.S. Pat. Nos. 3,269,190; 3,541,541; 3,835,464; 3,892,963 and 3,987,685). In general such devices have utilized pairs of transducer members, each member affixed to a shaft lying axially parallel to the generally flat surface upon which the X-Y position device is moved, each shaft either being attached directly to a wheel contacting the surface and rotating in a plane perpendicular to the surface on which movement is being generated, or else the shaft being supported such that it can be driven by frictional contact with what is termed a "transport sphere" or "transport wheel". Tilting of the wheel type of transport is known from the above-mentioned U.S. Pat. No. 3,892,963 but there the transducer shaft remained axially parallel to the contact surface—i.e., horizontal.

The first arrangement (direct connection) has the advantage of simplicity of structure, involving fewer parts as compared to the transport-driven shaft. In both arrangements, however, the size of the transducer member (a drum or disk, for example, with known indicia for detecting movement) has been limited both by the size of the wheel and by the need for clearance relative to housing surfaces. Therefore the transducer member has been of significantly smaller diameter than the wheel, the ratio of circumferential movement of the transducer drum or disk per unit of incremental movement of the wheel being much less than unity as a result. Under these conditions, the required fineness of the spacing between the movement indicia on the transducer member has been such that a very high order of accuracy is necessary if one attempts to increase the number of output signals from the transducer per unit of wheel movement.

On the other hand, consider position controllers of the type utilizing transport elements—e.g., a sphere (U.S. Pat. No. 3,987,685) or respective tilted transport wheels (U.S. Pat. No. 3,892,963)—for frictional driving of two orthogonally-oriented horizontal shafts bearing the respective X-Y transducers. Such transport elements tend to be relatively large and massive, thus having a higher moment of inertia than desirable—resulting in potential for error, particularly when there is a sudden initiation of motion of complete reversal in direction. Further, controllers of this type suffer the defect that they tend to slip when the support surface is very smooth or has a superficial film of oil or other lubricious fluid, this film being picked up and transferred to the contact area between transport element and shaft, causing more slip with resultant loss of accuracy. Another defect of some of this prior art is that transport spheres are "free" and require capture members to retain them in the housing. These members must readily release the spheres so they can be cleaned periodically in order to remove the above-mentioned films and dirt accumulations. Alternatively, known devices for automatic continuous cleaning must be incorporated, necessitating undue complexity in either case.

Lastly, the foregoing devices tend to be susceptible to damage from severe shock caused by carelessness of use or by the tendency of the user to vent his frustration on the inanimate object at hand—namely the X-Y position controller or "mouse".

SUMMARY OF THE INVENTION

The invention provides for an improvement in an X-Y position controller or mouse having orthogonal transducer assemblies, each assembly sensing a component of mouse motion over a substantially planar surface and being suitably mounted on the mouse, each assembly comprising a shaft rotatable within a journal bearing, the shaft having affixed thereon a drive element and a transducer element with transducing indicia located at a particular radial distance (r) from the shaft. The drive element is adapted to contact the planar surface and to rotate the shaft through an effective radius (R) upon a motion or the mouse having a component sensed by that assembly. The improvement resides in combining the foregoing with a support for the bearing attached to the mouse in a manner holding the bearing at a predetermined angle of less than 90°, yet non-parallel relative to the planar surface, thereby advantageously permitting the particular radial distance of the transducing indicia to be at least as great as the effective radius of the drive element.

As a further improvement, provision is made to urge the shaft of each transducer assembly toward the planar surface to augment the force at the contact between the drive element and that surface.

As yet a further improvement, a magnetic force is used to urge the shaft of each transducer assembly toward the planar surface.

Accordingly, it is a general object of the invention to provide an improved X-Y position controller or mouse, featuring simple, low-cost yet sensitive transducer assemblies, achieving this by inclining the shaft holding the elements of each transducer assembly.

It is yet another object of the invention to make an improved mouse that is less sensitive to the frictional characteristics or lubricious state of the surface on which the mouse rests during operation.

Other objects and features of the invention will become evident from the description which follows, best understood when considered in conjunction with the accompanying drawing.

BRIEF DESCRIPTION OF THE DRAWING

FIG. 1 is an isometric view, partially cut away for greater clarity, showing a mouse according to the invention, each of a pair of transducer assemblies in the mouse incorporating an inclined transducer shaft, a circular drive element at the lower end of the shaft contacting the usual flat surface for operating purposes.

FIG. 2 is an elevation view, also partially in section for greater clarity, showing details of one embodiment of a transducer assembly for the mouse of FIG. 1, in particular an inclined transducer shaft, the shaft angle being somewhat less than 90° with respect to the plane of mouse movement, the drive element at the lower end of the shaft being the frustum of a cone, and a pair of magnetic members urging the shaft toward the plane of movement.

FIG. 2a is another elevation view showing a portion of the inclined transducer shaft of FIG. 2, but with a polar segment of a sphere (inverted mushroom shape) as drive element in place of the drive cone of FIG. 2. Further, the drive element and the transducer disk are combined into a single element at the lower end of the shaft.

FIG. 2b is an elevation view showing a modification of the upper portion of the inclined transducer shaft of FIG. 2, the transducer disk likewise being frustum-shaped to afford a low-profile mouse. To this same end, the indicia on the transducer disk are here narrow reflective strips located on the underside of the transducer disk, a source of light and a photoelectric sensor both being on that same side and being adapted to sense passage of the strips.

FIG. 2c shows another modification of FIG. 2 in which the transducer element is in the form of an inverted cup—i.e., a right-circular cylinder with a thin wall—and a leaf spring is used in place of the magnetic members of FIG. 2 for urging the shaft.

FIG. 3 is an elevation view, also partially in section for greater clarity, showing a second embodiment of a transducer assembly having an inclined transducer shaft in a mouse according to the invention, but at a smaller angle than in FIG. 2, and having a ball or sphere at the lower end of the shaft contacting the usual flat surface for both drive and support purposes.

FIG. 3a is an elevation view, again partially in section, showing a modified lower portion of the inclined transducer shaft of FIG. 3, a thick right-circular disk with a rounded contact edge being used in place of the drive ball of FIG. 3.

FIG. 3b is another elevation view (likewise partially sectioned) showing a modified lower portion of the inclined transducer shaft of FIG. 3, a disk similar in shape to an oblate spheroid being used as a drive element.

It may be remarked that the above-mentioned sectioning does not apply to the shafts and drive wheels of the transducer assemblies in any of the figures.

FIG. 4 shows a plan view looking upward at the lower end of a conical drive element of the type shown in FIG. 2, but modified by addition of fine radial teeth for assuring the best possible engagement between the drive element and surface under adverse conditions.

FIG. 5 shows a plan view of a gate structure cooperating with the transducing disk of FIG. 2 in a manner allowing direction of disk rotation to selectively enable one or the other of a pair of sensors to detect the indicia on the disk.

DESCRIPTION OF THE PREFERRED EMBODIMENTS

A general view of a mouse 10 according to the invention is shown in FIG. 1. As can be seen in that figure, mouse 10 has a base 32 together with a cover 15 incorporating one or more switches 17. Depression of a given one of switches 17 after an operator has moved mouse 10 to bring a cursor, say, to a desired position in a display causes an appropriate signal to be sent to a utilization device (a known computer with a display unit—neither being shown in FIG. 1) via the usual communication cable 19. As known, cursor displacement is controlled by other signals also sent via cable 19 and generated by transducer assemblies 13X, 13Y mounted in novel fashion on base 32. Cover 15 and assembly 13X are cut away in FIG. 1 to reveal the elements of the assembly more clearly.

As evident, each of the assemblies 13X, 13Y includes a respective transducer disk 14 attached to a shaft 12 which also bears a drive element 26 normally held in contact with the operating surface 16 (by gravity, manual pressure and other sources of force described subsequently). As a result, movement of mouse 10 over surface 16 causes rotation of the shafts 12X, 12Y in variable amounts depending on the X and Y components of that movement. The rotation is detected by respective sensors 22X, 22Y which cooperate with indicia 18 on transducer disks 14X, 14Y to send appropriate signals along leads 23 to conditioning circuits 21 (shown in block form in FIG. 1)—as is well-known in the art.

According to the invention, therefore, the shafts 12X, 12Y of transducer assemblies 13X, 13Y are not held horizontally as in the prior art—that is, substantially parallel to operating surface 16. On the contrary, each of the shafts 12X, 12Y is journaled in a respective inclined column 29X, 29Y according to the first embodiment as shown in FIG. 1 and detailed in FIG. 2. In a second embodiment, each shaft 12X, 12Y is journaled in a respective bearing forming a distinct part of a vertical column 129X, 129Y and being held therein inclined with respect to surface 16, as detailed in FIG. 3. In the first, more preferred embodiment, each column 29X, 29Y rises from base 32 at an angle $\alpha$ of about 80°, whereas the bearings of the second embodiment hold shafts 12X, 12Y at an angle $\alpha$ of about 30°. The two embodiments (and a few variations of each) will now be described.

DETAILS OF THE FIRST EMBODIMENT

A transducer assembly 13 (X or Y) for the improved position controller or mouse 10 according to the invention is shown in FIG. 2 (the directional suffixes being omitted hereafter for simplicity except in those instances where a distinction may be of importance). As seen in FIG. 2, shaft 12—upon which a thin, disk-type transducer element 14 is rigidly affixed (by cementing or press-fitting, say)—has its axis 11 inclined at an angle $\alpha$ of roughly 80° with respect to the surface 16 over which mouse 10 is manually movable. Adjacent its lower end 24, shaft 12 bears an axially pre-bored wheel 26 in the shape of a frustum of a cone, the cone angle $\beta$ being about 140°, say. Wheel 26 is concentric with shaft 12 and rigidly attached to it (also by press fit, say) for purposes of frictional drive by contact with surface 16. As shown in FIG. 2, the edge 27 formed by the cutoff plane at the smaller end of the frustum-shaped wheel 26 is in contact (point 36) with the surface 16 over which motion of mouse 10 in the X direction (or the Y direction, two transducer assemblies being required as is known and shown in FIG. 1) is to be sensed (or metered). Edge 27 is preferably slightly rounded, as is known, to provide a broad rolling contact point 36 which is easily slidable over surface 16 even when rotation of wheel 26X, say, is not involved (motion solely in the Y direction—and vice versa for wheel 26Y, of course).

A journal bearing 28—forming a coaxial part of an inclined column 29 attached to the base 32 of mouse 10 (or integral with base 32)—receives shaft 12 for rotation therein and also for axial displacement, bearing 28 being held at an inclination of angle $\alpha$ with respect to base 32. Wheel 26 fixed to the lower end 24 of shaft 12 normally projects well below base 32 until mouse 10 is placed on surface 16, at which time shaft 12 is displaced upward, wheel 26 being urged into contact with surface 16 by gravity (or by a source of augmented force discussed subsequently).

Transducer element 14 may be of any type (i.e., adapted to sensing by known magnetic, Hall effect, photo-electric or other techniques). For purposes of this disclosure, element 14 of FIG. 2 is arbitrarily shown as a disk 14 adapted for photo-electric sensing, one row (or more) of equidistant slots 18 being located at points on disk 14 well-spaced from shaft 12 and lying between a source of light 20 and a light-responsive sensor 22, rotation of slots 18 into and then away from a position between the latter two elements resulting in successive appearance and disappearance of the response by the light-sensitive sensor 22 in known fashion.

Base 32 of this first embodiment is preferably provided with a known three-point support including a pad 37 and two shoulders 34, which shoulders are adjacent to and surround the contact point 36 established between each wheel 26 and surface 16. None of the three support points is visible in FIG. 1 and only one shoulder 34 is visible in FIG. 2 inasmuch as the other shoulder 34—the one for the axis Y, say, assuming FIG. 2 to show transducer assembly 13X'would be directly behind it. The height of each shoulder 34 is such that when the shoulder's end face 35 rests against surface 16, wheel 26 will be in contact with surface 16 and will preferably just clear the end face 38 of bearing 28 for minimal friction and minimal bending of shaft 12 beyond the journal portion (28, 30) upon establishing contact. The clearance is shown by gap 55 in FIG. 2.

Base 32 and bearing 28 may be molded of a high-lubricity plastic (e.g., a known polycarbonate resin incorporating a suitable amount of polytetrafluoroethylene to provide the desired low friction coefficient). An annular gap 53 surrounding the end face 38 is provided as part of the mold core design to avoid the shrinkage which would otherwise occur with a heavy section. As will be evident later from the modification depicted in FIG. 2a, one or more webs (49) may span the annular gap 53 not only for strengthening the support given to bearing 28, but also for other purposes described there.

The unitary, compact structure in FIG. 2a and absence of contact between wheel 26 and the end face 38 of bearing 28 results in a low-friction, low-inertia unit. Further, the radial distance "r" to slots 18 on transducer disk 14 relative to the effective drive radius "R" of wheel 26 at the contact point 36 is clearly evident to be greater than unity, thus lowering the requirement for accuracy in manufacture of slots 18. The diameter of disk 14 will obviously be limited only by the need to clear base 32 and cover 15 (cut away in FIG. 1 for greater clarity), these being, in turn, no larger than will allow mouse 10 to be of a size fitting comfortably in the user's hand. As a result, considerable latitude in design dimensions is afforded.

As currently envisioned, the effective radius "R" of drive element 26 from axis 11 to contact point 36 will be about 0.063 inch to about 0.125 inch. Contrastingly, a disk 14 with one row of transducing indicia, say, could have that row at a much larger radius (as is preferred) of about 0.400 inch from axis 11 of shaft 12 for cooperation with source 20 and sensor(s) 22. Such a row might consist of 40–50 slots 18 (width and spacing of slots 18 preferably being such that upon rotating disk 14, the output from sensor 22 has a duty cycle of 50 percent).

One or two rows of slots 18, and a pair of sensors 22, are contemplated, since both magnitude and direction of displacement are determinable in known fashion by providing signals in quadrature (as indicated by FIG. 4 of U.S. Pat. No. 3,987,685 and described with respect to the equivalent commutator-type structure in my above-identified pending application). This may be done, as is known, by using two sensors 22 angularly spaced from each other by an arbitrary number of pitch intervals (based on the angular pitch of slots 18, the number of intervals being selected for convenience of design or manufacture) adjusted by a quarter pitch in either direction. This may be expressed in formula form as $(KN \pm N/4)°$, where N is the angular pitch of slots 18 and K is any desired integer. The integer K may be chosen, for example, to yield about 180° of arc. On the other hand, for disks 14 having a double row of slots 18, it is known to use two sensors at the same angular location, with the slots being angularly offset by the above-mentioned quarter pitch.

Furthermore, though the indicia 18 are disclosed as slots, they could equally well be opaque bar areas on a transparent base, or reflective and absorbent (or transparent) areas on an appropriate base (the sensor 22 being on the same side of disk 14 as light source 20, in the last case, as will be seen more clearly in the later discussion of the modification shown in FIG. 2a).

While the assembly of disk 14, shaft 12 and wheel 26 will generally maintain adequate contact with surface 16 due to the force of gravity—the vertical component of force in FIGS. 2, 2a being quite effective in that respect due to the hig angle of incidence of shaft 12 ($\alpha = 80°$) relative to surface 16—under adverse surface conditions it may be desirable to provide augmented force in the contact area. In FIGS. 2a, 2b, this is achieved by using a pair of ring magnets 40, 41 for the purpose. To that end, one magnet 40 is fastened to a hub portion 15 of disk 14 (by use of a known adhesive, say) while the other magnet 41 is fastened to a hub portion 42 (which forms part of base 32 and also serves in part to extend bushing 28), as seen in FIG. 2. The ring magnets 40, 41 are preferably ceramic units, axially magnetized and mounted with polarities such that they attract one another. The attractive force of magnets 40, 41 and the spacing 44 between them may be such that when mouse 10 is resting against surface 16, but is not being pressed down by the user, base 32 (and shoulder 34) will be pulled upward relative to shaft 12 and thus held away from surface 16. This feature is not critical to the invention and can be dispensed with if desired, although it should be kept in mind that permitting contact to occur between hubs 45 and 42 (or magnets 40, 41) upon releasing pressure on mouse 10 does advantageously provide an automatic braking force. Another aspect of the magnetically-augmented force is that while the arrangement disclosed uses the force of attraction, a repulsion force could also be used (by appropriate orientation of the magnetic poles and relocation of magnets 40, 41, magnet 40 being supported on disk 14 on the side opposite to that shown in FIGS. 2, 2a and the other magnet 41 being affixed, say, to the outer cover 15—shown cut away in FIG. 1, but not shown in any of the other figures for simplicity—at a location positioning it adjacent magnet 40 when cover 15 is assembled to base 32). Another approach for augmenting force is shown in FIG. 2c, discussed later.

A more compact version of the embodiment of FIG. 2 is shown in FIG. 2a. There, the frictional drive for shaft 12 is effected via a polar segment of a sphere (or other ellipsoid) 26a instead of the conical wheel 26, and the disk 14 with its slots 18 is omitted, the indicia being presented as reflective strips 46 applied around the circumference of the cut-off plane 47 forming the upper surface of polar segments 26a. Strips 46 are located at radial positions outboard of the path defined by the succession of rolling contact points 36. The light sensor 22 is located in a recess 48 in a web 49 spanning the annular gap 53a around face 38 of journal bearing 28, recess 48 being located at a radial position adjacent the reflective strips 46 for cooperation with the latter. This cooperation generates the afore-mentioned signals conditioned by the circuits 21 and issued to the computer or other utilization device via cable 19, as shown in FIG. 1. Light source 20 is not visible in FIG. 2a, being located in the same housing as sensor 22 in this particular configuration and thus being hidden. Such disposition of source and sensor is also known in the art.

That the exact shape of the drive element (wheel 26 or equivalent) is not critical is a fact also shown by FIG. 2a, because the drive element here resembles an inverted mushroom in shape, the rolling contact point 36 being on a chordal plane offset from the above-mentioned cut-off plane 47. As will be seen from FIGS. 3-3b discussed subsequently, other shapes of drive element 26 are likewise suitable.

Accordingly, it will now be clear that the feature of prime importance in the invention is not the particular drive element 26 or 26a used, nor is it the precise nature of the transducer element 14, but rather it is the inclination of shaft 12 at an angle $\alpha$ of less than 90° with respect to surface 16 (and base 32 therefore). This follows because it is that inclination which makes possible an advantageous ratio—equal or greater than unity—between the radial distance "r" of indicia 18 from axis 11, and the effective operating radius "R" of drive element 26 (wheel or equivalent) at the rolling contact point 36.

It will be noted additionally that the magnetic force augmentation described above in connection with FIG. 2 has been retained in the variations depicted in FIGS. 2a,2b, even in the former variation where disk 14 is suppressed. There, only a stub 14a remains, with the hub 45 press-fitted to shaft 12a and a flange 39 on stub 14a giving solid support for magnet 40. Hence, it will likewise be clear now that this force-augmentation feature is also of considerable importance to the invention.

In yet another variation shown in FIG. 2b, disk 14b differs from disk 14 of FIG. 2 by having a skirt 43 formed by the frustum of a wide-angled cone for purposes of maintaining a lower elevation. In FIG. 2b, cone angle $\alpha$ is shown to be about 160° and such that a plane tangent to skirt 43 at the high point of its rotation will be essentially parallel to surface 16. Cone angle $\alpha$ is not critical inasmuch as the intent is to minimize the height of mouse 10 (including the cover 15 omitted entirely in FIGS. 2-2c) and therefore smaller angles $\gamma$ are contemplated, where desirable, as will be discussed shortly.

In order to take full advantage of this variant of FIG. 2, disk 14b of FIG. 2b has also been modified in fashion similar to that shown in FIG. 2a, slots 18 being replaced as indicia by reflective strips 46. In the present case, however, strips 46 are applied to the underside of disk 14b at the same angular locations as the slots 18 of FIG. 2. In accordance with this change, the light-responsive sensor 22 is also shown as located below transducer disk 14b directly adjacent light source 20 and in a position to intercept reflected ones of the emitted light rays in known fashion. The light-sensing combination 20, 22 could be located anywhere—e.g., 90°, say, in either clockwise or counter-clockwise direction away from the one shown, which is merely illustrative and subject to avoidance of any undesirable limitation as to locating the orthogonal one of the pair of transducer assemblies 13X, 13Y. With regard to this last, it may also be noted that the shafts 12X, 12Y need not be of the same length so that the respective disks 14X, 14Y (or 14aX, 14aY) may be nested.

Still another variation of the first embodiment is depicted in FIG. 2c. In this variation, the transducer element 14c retains the slots 18, but the cone angle $\gamma$ of FIG. 2b has been effectively reduced to zero, the skirt here forming a rightcircular cylinder 43c. As a result, transducer element 14c resembles an inverted cup. Another modification involves the augmented contact force, the magnets 40,41 having been omitted and the desired force provided instead by a leafspring 56 supported on an extension 60 of base 32 (or other suitable portion of mouse 10). Leafspring 56 is rigidly fastened at one end 57 to extension 60—by a screw 58, for example—and has its other end 59 contacting the upper end 25 of shaft 12. Leafspring 56 is stressed such that it urges shaft 12 toward surface 16 when mouse 10 rests on that surface, just as achieved before with the ring magnets 40,41 of FIGS. 2-2b.

DETAILS OF THE SECOND EMBODIMENT

A somewhat less preferred embodiment of the invention is the mouse 110 shown in FIG. 3, where the transducer assemblies 113 differ from assemblies 13 (X and Y units being identical except for alignment in mouse 110, hence the direction suffixes are again ignored except where their presence lends clarity) mainly in having a longer shaft 112 oriented more nearly horizontally (angle $\alpha$ of approximately 30°) with respect to surface 16. As before, shaft 112 of each assembly 113 supports a transducer disk 114 which may be of any type, but is again arbitrarily shown as being of the photo-electric kind. Hence, disk 114 is generally similar to disk 14 in that it too has peripheral slots 18 cooperating with light source 20 and light-responsive sensor(s) 22 to develop motion and direction signals in known fashion, as disk 114 rotates. Because of the lower value of angle $\alpha$, disk 114 is held at about 60° to base 132. The need to remain clear of both base 132 and also cover 15 (not shown in FIG. 3) is of greater significance here in determining the largest possible diameter of disk 114. Height restriction is a primary disadvantage of the arrangement according to this second embodiment.

Shaft 112 again passes through a journal bearing 128 which is supported on a vertical extension 129 of the base 132 of mouse 10, according to this second embodiment. Journal bearing 128 is held by extension 129 at the above-mentioned small angle, $\alpha$, of roughly 30° with respect to surface 16. Adjacent to its lower end 124, shaft 112 bears an axially pre-bored ball 126 (or, as it may be termed more generally, an "ellipsoid" 126) concentric with shaft 112 and rigidly attached to it (press fit, say) for purposes of frictional drive by contact with surface 16 at an effective drive radius "R" with respect to axis 111 of shaft 112. Journal bearing 128 holds shaft 112 for rotation therein just as in the first embodiment except that because of limited axial displacement (as will be described), ball 126 is urged into contact with surface 16 by the weight of mouse 110 or by the force of the user's hand pressing down on mouse 110. Column 129 is preferably dimensioned in known manner to permit adequate flexure in case of excessive pressure on mouse 110 or hard impacts against ball 126. Bearing 128 and at least pad 37 of base 132 are again preferably molded of a high-lubricity plastic (e.g., the known polycarbonate/polytetrafluoroethylene resin mix of the first embodiment).

In FIG. 3, base 132 is planar except for the pad or "glide" 37 identical with that shown in FIG. 2. Pad 37 again serves as one leg of a three-point support, the other two points being the balls 126 (X and Y) in each of the assemblies 113 (X and Y), only one ball 126 being visible in FIG. 3. The diameter of ball 126 and the length of bearing 128 are selected such that axial displacement of shaft 112 is limited when a contact point 136 is established between ball 126 and surface 16 by the weight of mouse 110 or application of the above-mentioned manual pressure on mouse 110. Under those circumstances, ball 126 is then in contact not only with surface 16, but also with the end face 138 of bearing 128—i.e., end face 138 acts as a thrust bearing. Note in FIG. 3 that end face 138 may be spherically dished to match the shape of ball 126, reducing the pressure and thus assuring longer wear life.

Several configurations of the type shown in FIG. 3 were designed, utilizing 5/16 inch and ⅜ inch diameter balls 126 and appropriately varied angles α from 30° to slightly over 35°, the effective drive radius "R" to contact point 36 being about 0.125 inch to 0.16 inch.

As shown in FIGS. 3a and 3b, the frictional drive for shaft 112 may alternately be effected by a wheel 126a or 126b instead of ball 126, the edge 127 of wheel 126a being preferably rounded for the same reason given with respect to the modified drives of the first embodiment. Such rounding is automatically provided by a circular profile at the periphery of wheel 126b, symmetry being advantageous for assembly purposes. The suitability of several drive elements for this second embodiment likewise demonstrates that the exact shape of the drive element is non-critical.

COMPARISON OF THE TWO EMBODIMENTS

Among the advantages that the embodiment of FIG. 2 (and its modifications in FIGS. 2a–2c) provides as compared with the second embodiment of FIG. 3, are the following:

(1) Shaft 12 may be of smaller diameter as compared with shaft 112 without being as subject to damage by bending, not only because support by bearing 28 is provided through a much smaller moment arm, but also because the larger angle of inclination (80° vs 30°) reduces the component of force generating the bending moment.

(2) The mass of the frustum-shaped wheel 26 is considerably less than that of ball 126 in FIG. 3.

(3) Disk 14 can be made much larger in diameter than disk 114, if desired, without increasing the height of mouse 10 significantly.

(4) Gap 33 between wheel 26 and the surrounding portion of base 32 as well as gap 55 between wheel 26 and bearing end 38 form a labyrinthine passage minimizing the possibility of deleterious effects attendant upon entrance of dirt and dust into the area between shaft 12 and bearing 28.

(5) Gap 55 between wheel 26 (or 26a) and bearing end 38 also reduces friction.

(6) Because the angle of incidence between axis 11 and surface 16 is high and protection is afforded by shoulders 34, the probability of impact damage due to dropping mouse 10 will be significantly lower. Even if impact occurs against an object small enough to enter within the confines of shoulder 34, such probability of damage will still be low because that impact will be braked by the counterforce of magnets 40, 41 (or spring 25 as in FIG. 2c) and then absorbed by contact with bearing end 38.

OTHER ASPECTS

While the figures implementing the foregoing disclosure (FIGS. 2, 2a, etc.) show only single transducing assemblies 13 (e.g., 12, 14 and 26), it will be recalled from FIG. 1 that pairs of these are required since both X and Y assemblies 13 are ordinarily concerned. Nevertheless, one such assembly in combination with a horizontal unit of the prior art type would still be advantageous where spatial or other considerations, say, might preclude use of a pair of assemblies 13. It is contemplated, however, that for a complete mouse 10 there will preferably be two such assemblies 13, each having its shaft 12 with inclined axis 11 lying in a vertical plane defined by axis 11 and the point of contact 36 with surface 16 (the low point of wheel 26). The respective vertical planes must be orthogonal to each other, of course, and the Y coordinate preferably aligned in parallel with the longitudinal axis of base 32.

As shown in FIG. 4, edge 27 may be textured, if desired, to provide improved drive characteristics for wheel 26 even under the most adverse conditions of surface 16 (e.g., operation on a slick, somewhat resilient surface such as a vinyl-coated desk top with oily fingerprints on it.

More reliable operation may be achieved by applying, for example, a continuous pattern of fine radial teeth 50 to edge 27 (by a knurling process, say). While texturing is depicted only with respect to the frustum-shaped wheel 26, it will be understood that it is equally applicable to drive elements of other shape, previously described. Generally, such texturing need be applied only to the drive element in an annular area 27a, covering the path 27 defined by the succession of contact points 36 (FIG. 2).

Lastly, it may also be mentioned that where slots 18 (or other form of indicia) are provided in just one peripheral row on disk 14 (114) then a "direction gate" 146 of known type (as in commercially available "track ball" display position controls such as the LT200 series made by Disc Instruments of Costa Mesa, Calif.) may be utilized, being operable here—see FIG. 5—by drag induced in cooperation with the moving one of the magnets 40 (assuming the gate material to be ferromagnetic, of course) or by mechanical force, for purposes of detecting changes in direction of rotation of wheel 26 (or ball 126). For example, as seen in FIG. 5, gate 146 may be reciprocated about shaft 12 as a pivot by virtue of a concentric, running-fit hole 148 adjacent the end 149 of gate 146. The above-mentioned induced drag moves a tab 156L (or 156R) projecting from the other end 150 of gate 146, against one side 155L or the other (155R) of a stop 152 (attached to or forming part of base 32, say), depending on the direction of rotation of disk 14 to which magnet 40 is attached. When transducer disk 14 rotates rightward (relative to stop 152—i.e., ccw), then—as seen in FIG. 5, gate 146 rotates with it because of the attractive force exerted by magnet 40. That situation persists until tab 156L is brought against the corresponding side 155L of stop 152. At that point, gate 146 ceases to rotate and has an aperture 154 in alignment between a source of light and a particular one of a pair of photocells 162 (162R in the example shown). This source, not visible in FIG. 5 as it is above the plane of the figure, may be identical in type to source 20 previously described. Photocells 162 may similarly be identical in type to sensors 22 also previously described. In any event, as disk 14 continues to rotate, passage of each slot 18 between the light source and photocell 162R produces a pulse on a corresponding output lead 164L (the other lead of the pair seen in FIGS. 1-3 not being shown here, but being connected in known fashion to a voltage source, say). In this manner, a train of binary signals defines the amount of cursor motion, while the particular lead on which the signals appear determines the "sign" of the motion. Note from FIG. 5 that the right and left sensors 162R and 162L are positioned close to disk 14 to minimize the effects of stray light (all surfaces being preferably blackened for that same reason, of course). Because of their size, the sensors 162 are spaced by at least 2 N center-to-center (N being the angular pitch of slots 18, as before). As a result, to avoid missing a pulse when the direction of motion reverses, the aperture 154 preferably is also about 2 N in width, allowing light to fall on both slot 18a and slot 18b when the former is aligned with sensor 162R. Accordingly, if rotation reverses, it is the previously following slot 18b which first produces a pulse by exposing photocell 162L to light previously masked by the side portion 159 of gate 146. It may also be mentioned, lastly, that gate 146 is retained on shaft 12 by suitable means (a known e-ring, say) also not visible in FIG. 5.

The foregoing has described a mouse (X-Y position controller) 10 (or 110) in which the shaft 12 (or 112) of one or both the transducer assemblies (13 or 113) therein is inclined with respect to the base 32 (or 132) of mouse 10 (and, therefore, similarly inclined with respect to the surface 16 over which mouse 10 is moved). For this purpose, shaft 12 is journaled in a bearing 28 supported on base 32 at an angle less than 90° (the angle ranging from about 80° down to about 30°, the former being more preferred) with the result that a transducing element 14 on shaft 12 can have its transducing indicia (slots 18) at a radial distance "r" from shaft 12 which is at least as great as—and potentially substantially greater than—the effective drive radius "R" of a wheel 26 or other drive element (26a, 126, etc.) attached to the same end or an opposite end of shaft 12. As mouse 10 is moved from one spot to another, contact between the wheel 26 (or equivalent) and the surface 16 rotates shaft 12 together with disk 14, circumferential motion of slots 18 being equal to or greater than the peripheral movement of wheel 26 (or equivalent) at the rolling contact point 36. Magnetic elements 40, 41 may be disposed on bearing 28 and disk 14 in a manner to augment the thrust of wheel 26 (or equivalent) against surface 16.

Although the foregoing description has been couched in terms of specific details of construction, it must be recognized that those skilled in the art will readily envision further modifications without departing from the spirit of the invention. For example, the columns 29, 129 need not be part of a base 32 because it is possible to attach them to the cover 15 (with further addition of a projecting pad 37 at one end of cover 15) and dispense with base 32 altogether. Accordingly it is intended that such modifications fall within the scope of the invention, which is to be limited only by the appended claims.

I claim:

1. In an X-Y position controller—i.e., a "mouse" (10)—having orthogonal transducer assemblies (13X, 13Y), each assembly sensing a component of mouse motion over a substantially planar surface (16), the assemblies being suitably supported on the mouse and each comprising a shaft (12) rotatable within a journal bearing (28), the shaft having affixed thereon a drive element (26) and a transducer element (14) with transducing indicia (18) located at a particular radial distance (r) from the shaft, the drive element being adapted to contact (36) the planar surface (16) and through an effective radius (R) to rotate the shaft upon a motion of the mouse having a component sensed by that assembly; the improvement comprising combination therewith of an inclined support (29) for at least one said bearing in said mouse, said support holding said bearing at a predetermined angle less than 90° yet non-parallel relative to said planar surface, resultant inclination of the transducer shaft thereby permitting said particular radial distance (r) of the transducing indicia to be at least as great as said effective radius (R) of the drive element.

2. The mouse of claim 1, wherein said predetermined angle ranges from about 80° down to about 30°.

3. The mouse of claim 1, wherein said support is affixed to a base portion of the mouse, said base portion having an aperture therein, and said drive element protruding therethrough into contact with said planar surface.

4. The mouse of claim 3, wherein said base portion further includes a shoulder adjacent the aperture and intervening between the base portion and the planar surface.

5. The mouse of claim 1 wherein the line of contact between said planar surface and said drive element includes radial teeth.

6. The mouse of claim 1 wherein said transducing indicia are mounted on said drive element.

7. The mouse of claim 1 wherein said shaft is axially slidable within said journal bearing between a first position wherein said drive element does not extend beyond an apertured base on the bottom of said mouse and a second position wherein said drive element extends beyond said base.

8. The mouse of claim 7 wherein said journal bearing is inclined at an angle to said planar surface such that when said planar surface is horizontal said shaft slides toward said second position by the force of gravity.

9. The mouse of claim 7 wherein said predetermined angle is about 80 degrees.

10. The mouse of claim 7 including a first magnet fixed to said transducer assembly and a second magnet fixed in said mouse within the magnetic field of said first magnet and with the polarity of said second magnet urging said drive element toward said second position.

11. The mouse of claim 7 wherein said journal bearing includes an end face facing said drive element and spaced from said drive element a distance sufficient to permit said drive element to slide to said first position.

12. The mouse of claim 1 having a base, a column fixed to said base, an inclined journal bearing fixed to said column and thrust bearing means between said journal bearing and said drive element restricting said drive element shaft from sliding axially into said mouse.

13. The mouse of claim 12 wherein said column is flexible.

14. The mouse of claim 12 having a base, apertures in said base through which said drive element protrudes and a glider fixed to said base to intervene between said base and said planar surface.

* * * * *

UNITED STATES PATENT AND TRADEMARK OFFICE
CERTIFICATE OF CORRECTION

PATENT NO. : 4,628,755
DATED : December 16, 1986
INVENTOR(S) : Jack S. Hawley

It is certified that error appears in the above-identified patent and that said Letters Patent are hereby corrected as shown below:

Column 5, line 26 delete "13X'would" and insert ---13X - would---.

Column 6, line 33 delete "hig" and insert ---high---.

Column 7, lines 52 and 54 delete the Greek letter alpha and insert the Greek letter gamma in its place.

Signed and Sealed this

Twenty-fourth Day of March, 1987

Attest:

DONALD J. QUIGG

*Attesting Officer*  *Commissioner of Patents and Trademarks*